United States Patent [19]
Cockrill

[11] Patent Number: 6,044,573
[45] Date of Patent: Apr. 4, 2000

[54] MEASURING DEVICE

[76] Inventor: Huston G. Cockrill, 349 Fiske St., Holliston, Mass. 01746

[21] Appl. No.: 09/047,537

[22] Filed: Mar. 25, 1998

[51] Int. Cl.[7] ................................................ G01B 3/22
[52] U.S. Cl. .................. 33/836; 33/464; 33/812; 403/362; 269/902; 269/246; 269/287
[58] Field of Search ................ 33/836, 464, 812; 285/33; 403/362; 269/902, 246, 287

[56] References Cited

U.S. PATENT DOCUMENTS

| | | | |
|---|---|---|---|
| 2,568,952 | 3/1951 | Dailey | 269/902 |
| 3,385,592 | 5/1968 | Hasell et al. | 269/287 |
| 3,901,499 | 8/1975 | Sporrer | 269/287 |
| 3,936,945 | 2/1976 | Jevremov | 33/836 |
| 4,489,497 | 12/1984 | Schemel et al. | 33/836 |
| 4,491,307 | 1/1985 | Ellefson | 269/287 |
| 4,529,332 | 7/1985 | Glabiszewski | 403/362 |
| 4,898,238 | 2/1990 | Grantom | 269/902 |
| 4,936,024 | 6/1990 | Greenslade | 33/836 |
| 5,228,798 | 7/1993 | Tzanovici | 403/362 |
| 5,513,838 | 5/1996 | Van Rossum | 269/287 |
| 5,909,980 | 6/1999 | Holdsworth | 403/362 |

*Primary Examiner*—Peter S. Wong
*Assistant Examiner*—Pia Tibbits
*Attorney, Agent, or Firm*—John E. Toupal; Harold G. Jarcho

[57] ABSTRACT

A measuring device including a gage having a dial, a pointer associated with the dial, and an actuator stem operatively coupled to the pointer; and a coupling mechanism having a connector portion detachably secured to the actuator stem; and a receiver portion defining a recess having first and second longitudinally extending, transversely spaced apart and parallel support surfaces. Also included is a probe pin disposed in the recess, the probe pin being longitudinally aligned with and supported by the first and second support surfaces; and a retainer mechanism exerting on the probe pin a force directed toward the first and second support surfaces. The coupling mechanism permits use of the gage with diametric gage pins selected from commercially available sets of such pins.

21 Claims, 3 Drawing Sheets

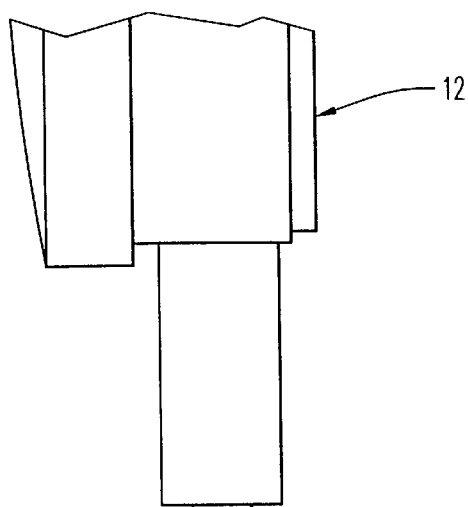
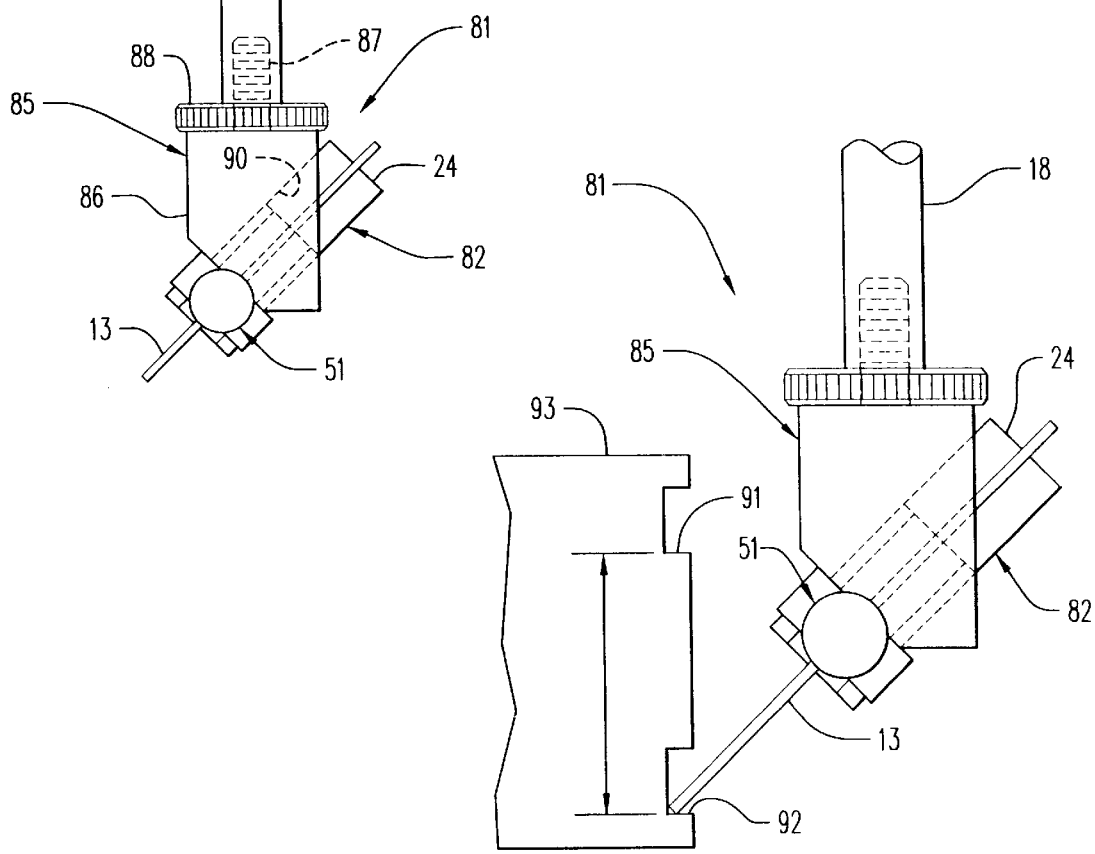

MEASURING DEVICE

BACKGROUND OF THE INVENTION

This invention relates generally to a measuring device and, more particularly, to a measuring device including a dial indicator gage coupled to a selected gage pin.

Dial indicator gages are specifically used to determine if the diameter and surface characteristics of machined recesses are accurate to some known standard and such gages include head members which gage the surface and have portions operatively connected to a dial indicator which indicates conditions and size of the recess. Such dial indicator gages are generally used to accurately determine if the surface characteristics of a recess are of the desired size or if the size is off by some amount. Typically, the indicator gage is provided with a custom indicator point which can access the small recess to be gaged. The fabrication or purchase of such customized indicator points is both costly and time consuming.

The object of this invention, therefore, is to provide an improved, more efficient dial indicator gage for measuring certain dimensional characteristics of machined parts.

SUMMARY OF THE INVENTION

The invention is a measuring device including a gage having a dial, a pointer associated with the dial, and an actuator stem operatively coupled to the pointer; and a coupling mechanism having a connector portion detachably secured to the actuator stem; and a receiver portion defining a recess having first and second longitudinally extending, transversely spaced apart and parallel support surfaces. Also included is a probe pin disposed in the recess, the probe pin being longitudinally aligned with and supported by the first and second support surfaces; and a retainer mechanism exerting on the probe pin a force directed toward the first and second support surfaces. The coupling mechanism permits use of the gage with diametric gage pins selected from commercially available sets of such gage pins.

According to one feature of the invention, the retainer mechanism is adapted to distribute the force substantially equally between the first and second support surfaces. This feature enhances stability of the retained pin.

According to another feature of the invention, the probe pin is substantially aligned with the actuator stem. This feature enhances efficient use of the device.

According to yet another feature of the invention, the first and second support surfaces are defined by, respectively, first and second inclined walls. The inclined walls further stabilize the probe pin in the receiver portion.

According to still another feature of the invention, the inclined walls are formed by a V-shaped slot in the receiver portion, the slot having a rectilinear apex extending parallel to the first and second support surfaces. Desired probe pin alignment is facilitated by this feature.

According to a further feature of the invention, the retainer mechanism includes a hood extending over at least a portion of the slot, and a screw threadedly engaged in the hood and projecting into the slot. Tightening of the screw provides the desired force on the probe pin.

According to an additional feature of the invention, the screw is movable into engagement with the pin to produce the force and the screw is movable on a path aligned with the rectilinear apex. This feature provides a desired direction of applied force on the pin.

According to certain other features of the invention, the receiver portion includes a cylindrical portion defining the slot, an inner end wall and a radially extending outer end wall with the inner and outer end walls straddling the slot; a hollow cylinder surrounding the cylindrical portion, defining the hood and engaging the outer end wall; and the cylindrical portion further defines a planar portion extending between the inner end wall and the slot with the planar portion being aligned with the apex. These features facilitate fabrication of an efficient coupling mechanism.

According to another feature of the invention, the connector portion has a threaded shank projecting from the inner end wall and threadedly engaged with the actuator stem. The threaded shank facilitates mounting of the coupling mechanism on the actuator stem.

According to another embodiment of the invention, the probe pin is disposed transversely to the actuator stem. This embodiment can be used in different measurement applications.

DESCRIPTION OF THE DRAWINGS

These and other objects and features of the invention will become more apparent upon a perusal of the following description taken in conjunction with the accompanying drawings wherein:

FIG. 6 is an elevational view of another transverse coupling embodiment for use with the measuring device of FIG. 1; and FIG. 7 is an elevational view illustrating use of the coupling mechanism shown in FIG. 6.

DESCRIPTION OF THE PREFERRED EMBODIMENTS

Figure 1:
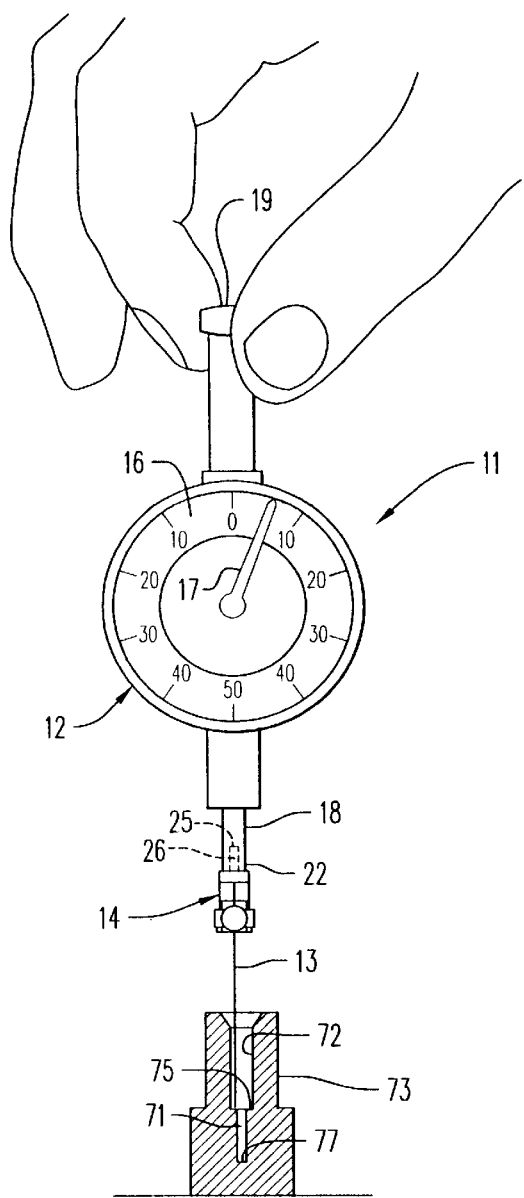
FIG. 1 is a front elevational view of a measuring device according to the invention.

A measuring device 11 includes a gage 12 detachably secured to a probe pin 13 by a coupling mechanism 14. The gage 12 is a conventional dial indicator gage having a dial 16 and associated pointer 17. Operatively coupled to the pointer 17 is an actuator stem 18 having an operator knob 19. A conventional mechanism (not shown) translates linear motion of the actuator stem 18 into rotary motion of the pointer 17.

Figure 2:
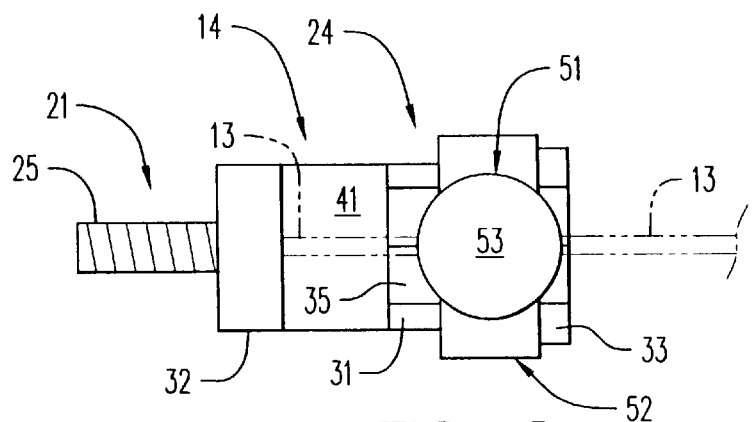
FIG. 2 is a top plan view of a coupling device used in the measuring device of FIG. 1.
Figure 3:
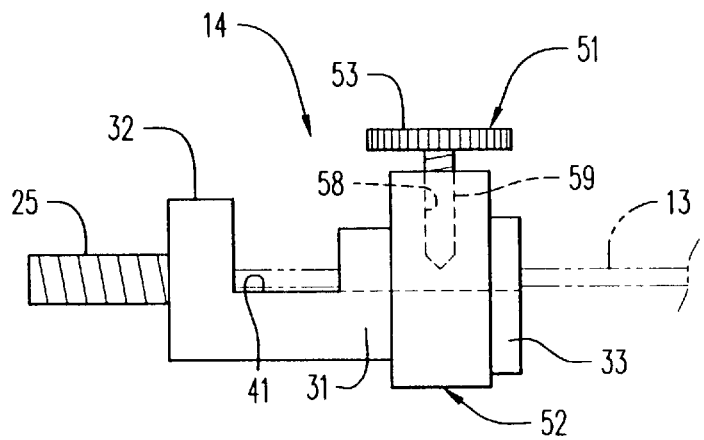
FIG. 3 is a side view of the coupling shown in FIG. 2.
Figure 4:
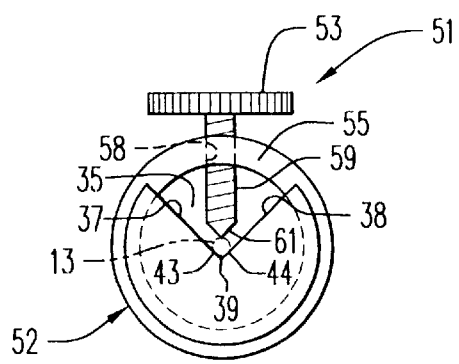
FIG. 4 is an end view of the coupling shown in FIGS. 2 and 3.

The coupling mechanism 14 is illustrated more clearly in FIGS. 2–4. Forming the coupling mechanism 14 are a connector portion 21 detachably secured to one end 22 of the stem 18 and a receiver portion 24 accommodating the probe pin 13 shown in dashed lines in FIGS. 2 and 3. The connector portion 21 consists of a threaded shank 25 received by a threaded, axial bore 26 in the end 22 of the stem 18.

The receiver portion 24 of the coupling mechanism 14 has a cylindrical portion 31 straddled by an inner circular end wall 32 and a radially projecting outer end wall 33. Formed in the cylindrical portion 31 and extending through the outer end wall 33 is a V-shaped recess slot 35. The tapered slot 35 is defined by first and second inclined walls 37, 38 intersecting along rectilinear line 39. Also formed in the cylindrical portion 31 of the receiver portion 24 is a planar portion 41 extending between the inner end wall 32 and the slot 35 and aligned with the rectilinear line 39 thereof. The first and second walls 37, 38, define, respectively, longitudinally extending, and transversely spaced apart unidirectional first and second support surfaces 43, 44 extending unidirectionally to the line 39. Engaged by and supported by the support surfaces 43, 44 is the probe pin 13 accommodated by the receiver portion 24 of the coupling mechanism 14.

The probe pin 13, preferably of the type usually sold in sets having multiple sizes and typically used in machine shops to measure the diameter of machined holes, is retained in the receiver portion 24 of the coupling mechanism 14 by a retainer mechanism 51. Forming the retainer mechanism 51 is a hollow retainer cylinder 52 and a retainer thumb screw 53. The hollow cylinder 52 surrounds the cylindrical portion 31 of the coupling mechanism 14 and is positioned by engagement with the outer end wall 33. A hood portion 55 of the hollow cylinder 52 extends over a given length portion of the V-shaped slot 35. Formed in the hood portion 55 is a threaded orifice 58 that receives a threaded shank 59 of the thumb screw 53. Manual turning of the thumb screw 53 produces rectilinear movement of the shank 59 in a path aligned with the rectilinear line 39 of the slot 35. A predetermined length of such movement produces engagement between a tapered end 61 of the shank 59 and the probe pin 13 to provide a force directed toward the first and second rectilinear support surfaces 43, 44 of the V-shaped slot 35. Because of their unidirectional relationship, the force applied to the probe pin 13 is distributed equally between the first and second support surfaces 43, 44. Consequently, tightening of the thumb screw 53 produces no component of force tending to cause misalignment of the probe pin 13 within the V-shaped slot 35. In a preferred embodiment of the invention, the coupling 14 and retainer hood portion 55 are formed as a single integral member.

Figure 5:
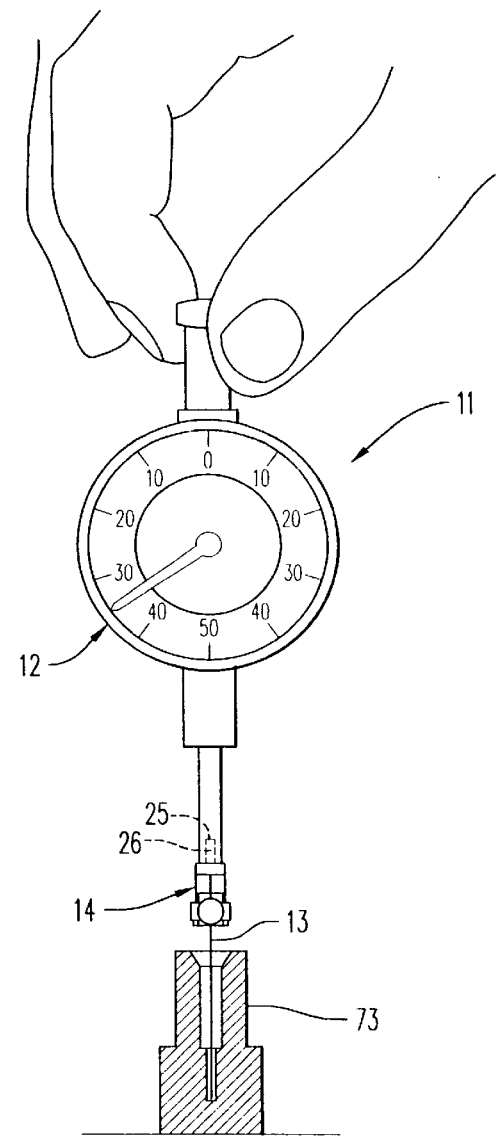
FIG. 5 is a front elevational view illustrating use of the device shown in FIG. 1.

During typical use, the measuring device could be used, for example, to measure the length of an internal bore 71 communicating with an axially aligned outer bore 72 in a piece part 73 (FIG. 1). The operator knob 19 of the gage 12 first would be lowered to produce engagement between the probe pin 13 and a shoulder portion 75 between the inner and outer bores 71, 72 as shown in FIG. 1. That operation would produce a movement of the pointer 17 to provide a given reading on the dial 16. Next, the operator knob 19 would be lowered to provide downward movement of the actuator stem 18 until engagement is produced between the probe pin 13 and the inner end 77 of the internal bore 71 as shown in FIG. 5. A resultant reading on the dial 16 would then be compared to the previous reading to establish the depth of the internal bore 71.

Depicted in FIG. 6 is another measuring device employing a modified coupling mechanism 82 for detachably securing a diametric gage pin 13 to the actuator stem 18 of a conventional indicator gage. Except for elimination of the inner end wall 32, the receiver portion 24 of the coupling mechanism 82 is identical to the receiver portion of the measuring device 11 (FIG. 1) and portions thereof have been given the same reference numerals. However, a connector portion 85 of the coupling mechanism 82 has a modified configuration with an outer spindle portion 86 and threaded shank portion 87 received by the actuator stem 18 and secured thereto by a locking nut 88. The receiver portion 24 is received by the spindle portion 86 in an opening 90 having an angled relationship that orients the retained probe pin 13 transversely to the actuator stem 18 rather than substantially axially aligned therewith as in the measuring device 11.

Preferably, the probe pin 13 is oriented to establish an angle of about 45° with the axis of the actuator stem 18.

The measuring device embodiment 81 can be used, for example, to measure the distance between spaced apart ledge portions 91, 92 of a piece part 93 illustrated in FIG. 7. In the manner described above, the actuator stem 18 would be lowered or raised into positions that sequentially produce engagement between the outer end of the probe pin 13 and each ledge portion 91, 92 of the piece part 93. A comparison of gage readings then provides an accurate measurement of the spacing between the ledge levels 91, 92.

Obviously, many modifications and variations of the present invention are possible in light of the above teachings. It is to be understood, therefore, that the invention can be practiced otherwise than as specifically described.

What is claimed is:

1. A measuring device comprising:
    a gage including a dial, a pointer associated with said dial, and an actuator stem operatively coupled to said pointer;
    coupling means comprising a connector portion detachably secured to said actuator stem; and a receiver portion defining a tapered recess having longitudinally extending, transversely spaced apart unidirectional first and second support surfaces;
    a probe pin disposed in said tapered recess, said probe pin being longitudinally aligned with and supported by said first and second support surfaces; and
    retainer means for exerting on said probe pin forces directed toward said first and second support surfaces so as to prevent longitudinal misalignment of said probe pin.

2. A measuring device according to claim 1 wherein said retainer means is adapted to distribute said force substantially equally between said first and second support surfaces.

3. A measuring device according to claim 2 wherein said probe pin is substantially aligned with said actuator stem.

4. A measuring device according to claim 3 wherein said first and second support surfaces are defined by, respectively, first and second inclined walls.

5. A measuring device according to claim 4 wherein said inclined walls are formed by a V-shaped slot in said receiver portion, said inclined walls intersecting along a rectilinear line extending unidirectionally to said first and second support surfaces.

6. A measuring device according to claim 5 wherein said retainer means comprises a hood extending over at least a portion of said slot, and a screw threadedly engaged in said hood and projecting into said slot.

7. A measuring device according to claim 6 wherein said screw is movable into engagement with said pin to produce said forces, said screw being movable on a path aligned with said rectilinear line.

8. A measuring device according to claim 7 wherein said screw has a tapered end for engaging said pin.

9. A measuring device according to claim 8 wherein said receiver portion comprises a cylindrical portion defining said slot, an inner end wall and a radially extending outer end wall, said inner and outer end walls straddling said cylindrical portion; a hollow cylinder surrounding said cylindrical portion, defining said hood and engaging said outer end wall.

10. A measuring device according to claim 8 wherein said cylindrical portion further defines a planar portion extending between said inner end wall and said slot, said planar portion being aligned with said line.

11. A measuring device according to claim 10 wherein said connector portion comprises a threaded shank projecting from said inner end wall and threadedly engaged with said actuator stem.

12. A measuring device according to claim 2 wherein said probe pin is disposed transversely to said actuator stem.

13. A measuring device according to claim 12 wherein said first and second support surfaces are defined by, respectively, first and second inclined walls.

14. A measuring device according to claim 13 wherein said inclined walls are formed by a V-shaped tapered slot in said receiver portion, said inclined walls intersecting along a rectilinear line extending unidirectionally to said first and second support surfaces.

15. A measuring device according to claim 14 wherein said retainer means comprises a hood extending over at least a portion of said slot, and a screw threadedly engaged in said hood and projecting into said slot.

16. A measuring device according to claim 15 wherein said screw is movable into engagement with said pin to produce said forces, said screw being movable on a path aligned with said rectilinear line.

17. A measuring device according to claim 16 wherein said screw has a tapered end for engaging said pin.

18. A measuring device according to claim 17 wherein said receiver portion comprises a cylindrical portion defining said slot, an inner end wall and a radially extending outer end wall, said inner and outer end walls straddling said slot; a hollow cylinder surrounding said cylindrical portion, defining said hood and engaging said outer end wall.

19. A measuring device according to claim 18 wherein said cylindrical portion further defines a planar portion extending between said inner end wall and said slot, said planar portion being aligned with said line.

20. A measuring device according to claim 19 wherein said connector portion comprises a threaded shank projecting from said inner end wall and threadedly engaged with said actuator stem.

21. A coupling device comprising:

coupling means comprising a connector portion for detachable securement to an actuator; and a receiver portion defining a tapered recess having at least an end wall and longitudinally extending, transversely spaced apart unidirectional first and second support surfaces; said tapered recess being shaped and arranged to receive a probe pin in longitudinal alignment with and supported by said first and second support surfaces; and retainer means for exerting on the probe pin forces directed toward said first and second support surfaces; said retainer means comprising a hood integrally formed with said coupling means and extending over at least a portion of said recess, and a screw threadedly engaged in said hood and movable into said recess to engage the pin and distribute said forces substantially equally between said first and second support surfaces so as to securely retain the probe pin in said recess and prevent longitudinal misalignment of the probe pin.

* * * * *